United States Patent
Weng

(10) Patent No.: US 7,250,744 B2
(45) Date of Patent: Jul. 31, 2007

(54) QUASI AVERAGE CURRENT MODE CONTROL SCHEME FOR SWITCHING POWER CONVERTER

(75) Inventor: Da Feng Weng, 20689 Park Cir. West, #4, Cupertino, CA (US) 95014

(73) Assignee: Da Feng Weng, Cupertino, CA (US)

( * ) Notice: Subject to any disclaimer, the term of this patent is extended or adjusted under 35 U.S.C. 154(b) by 202 days.

(21) Appl. No.: 10/831,750

(22) Filed: Apr. 26, 2004

(65) Prior Publication Data
US 2005/0237041 A1 Oct. 27, 2005

(51) Int. Cl.
*G05F 1/00* (2006.01)
*H03K 7/08* (2006.01)
*H02M 1/12* (2006.01)

(52) U.S. Cl. .................... 323/282; 332/110; 363/41
(58) Field of Classification Search ................ 323/282, 323/284, 351, 288, 222, 283, 322, 285; 363/74, 363/78, 41, 75, 76, 79; 332/110, 109
See application file for complete search history.

(56) References Cited

U.S. PATENT DOCUMENTS

| | | | | |
|---|---|---|---|---|
| 5,170,333 A | * | 12/1992 | Niwayama | 363/21.11 |
| 5,341,286 A | * | 8/1994 | Inoue et al. | 363/98 |
| 5,475,296 A | * | 12/1995 | Vinsant et al. | 323/223 |
| 5,526,252 A | * | 6/1996 | Erdman | 363/41 |
| 5,612,610 A | * | 3/1997 | Borghi et al. | 323/222 |
| 5,723,974 A | * | 3/1998 | Gray | 323/282 |
| 5,867,379 A | * | 2/1999 | Maksimovic et al. | 363/89 |
| 5,982,161 A | * | 11/1999 | Nguyen et al. | 323/284 |
| 6,061,258 A | * | 5/2000 | Galbiati et al. | 363/98 |
| 6,191,566 B1 | * | 2/2001 | Petricek et al. | 323/224 |
| 6,278,320 B1 | * | 8/2001 | Vu | 327/539 |
| 6,337,788 B1 | * | 1/2002 | Balakrishnan et al. | 361/86 |
| 6,377,480 B1 | * | 4/2002 | Sase et al. | 363/49 |
| 6,680,604 B2 | * | 1/2004 | Muratov et al. | 323/285 |
| 6,756,771 B1 | * | 6/2004 | Ball et al. | 323/222 |
| 6,812,681 B1 | * | 11/2004 | Hong et al. | 323/283 |
| 6,958,594 B2 | * | 10/2005 | Redl et al. | 323/282 |
| 7,123,494 B2 | * | 10/2006 | Turchi | 363/89 |

OTHER PUBLICATIONS

WO 01/73532 Muratov, Methods to Control Droop, Oct. 4, 2001, Wolrd Intellectual Property Organization, pp. 1-34.*

* cited by examiner

*Primary Examiner*—Karl Easthom
*Assistant Examiner*—Harry Behm

(57) ABSTRACT

A quasi average current mode control scheme is provided. The control scheme allows only detecting one part of the inductor current of the switching converter to control the inductor current and make the average current of the inductor follow the reference current. The control scheme is noise insensitive and makes the whole controlled system cost effective.

8 Claims, 3 Drawing Sheets

QUASI AVERAGE CURRENT MODE CONTROL SCHEME FOR SWITCHING POWER CONVERTER

BACKGROUND OF THE INVENTION

The present invention relates to switching converter using several topologies. More particularly, the invention relates to a new control scheme to control the inductor current of the switching converter, and the switching converter can be used as a controllable current source for several applications.

In existed switching converter control schemes, there are several control methods. They can be classified as voltage mode control and current mode control. Due to the advantages of current mode control in switching converter, several current mode control schemes have been introduced and analyzed. For the current mode control, it can be classified as peak current mode and average current mode controls. So far, in order to simply implement, the peak current mode has been widely used in switching power supply application. In the peak current mode control scheme of the switching power supply, only part of the inductor current information is detected to adjust the equivalent current source. With the regulation of the voltage loop, the switching power supply can have a very proficient line and load performance. The average current mode is particularly useful in applications such as power factor correction and current source, e.g. battery charger and LED driver. In this kind of application, there is no a fast response voltage loop to adjust the output current due to a variable load. To implement the average current mode control, it is required to collect all information of the inductor current. In an online application, the requirement to collect all inductor current information is easier to satisfy. In an off line application, it will be much tougher due to an isolation requirement issue. The question from the application is whether there is a control scheme only to detect a part of the inductor current information to make the control performance much closer to the average current mode control performance. The present invention is to present a control scheme that can detect only a part of the inductor current and make the control performance much closer to the average current mode control performance; that is, a very proficient line and load regulation.

SUMMARY OF THE INVENTION

The present invention discloses a novel "Quasi Average Current Mode Control" scheme to control a switching converter and make the inductor current of the switching converter follow a reference current. This way, the output of the switching converter is a current source for several applications. The invention control scheme can also be used to build a current loop with a voltage loop to control the switching power supply in order to ensure good performance.

The invented control scheme uses all information in a part of the inductor current, including slew rate, valley and peak values and instant average current. The easiest way to detect part of the inductor current is to detect the power switching current. The control scheme is composed of several blocks as shown in FIG. 1; the Reference block, State detect block, Error generator, Error amplifier and PWM generator.

In order to compare the reference current and the average inductor current, only the power switch turn-on current is detected as a part of the inductor current and the power switch turn-off current is zero, so the reference current should be traded in a suitable format in order to compare with the power switch turn-on current. In the reference block, the reference current is generated as in a suitable format. At the same time, in the state detect block, the detected power switch current is generated in the same format of the reference current. It is clear that during the power switch turn-on time, the difference between the reference current and power switch current, or the inductor current can be detected. During the power switch turn-off time though, both the reference current and power switch current are zero.

In the error generator, the signal of the difference between the reference current and power switch current is detected and sample-held, or accumulated. The detected error can be much closer to the difference between the reference current and the average inductor current.

It is the difference between the reference current and the average inductor current that can be amplified and compensated in the error amplifier and generated as a series of PWM pulses in a PWM generator. Due to the converter's regulation loop, the difference can be minimized and the average inductor current can be followed with the reference current.

DETAIL DESCRIPTION OF THE INVENTION

Figure 1:
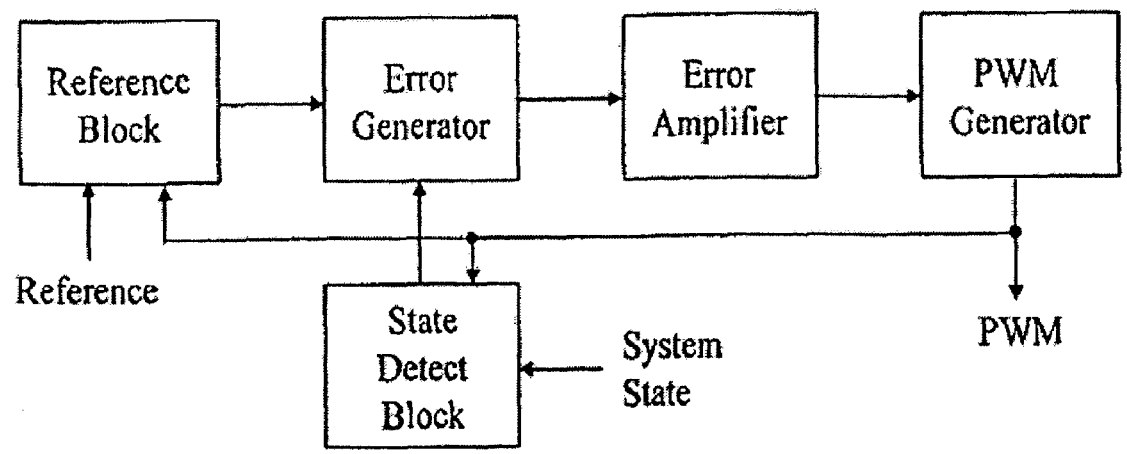
FIG. 1 is a general "Quasi Average Current Mode Control" scheme block diagram of the present invention.
Figure 2:
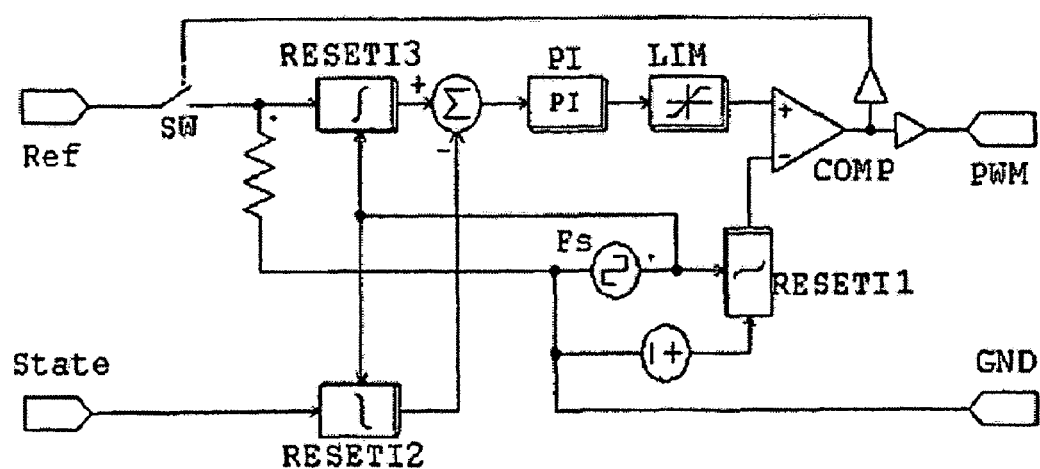
FIG. 2 is one of detailed embodiment of the "Quasi Average Current Mode Control" scheme block diagram of the present invention.

FIG. 2 shows one detailed embodiment of invention scheme block diagram. In the detailed block diagram, there are several blocks: SW, PI, LIM, COMP, RESETI and a time clock Fs.

There are three resetable integrators in the whole block diagram. The resetable integrator is the easiest to build up. For example, it can be composed of a voltage-current converter, a capacitor and a switch or a switchable current source. The switchable current source or the switch itself is used to control the capacitor's discharge current. The switch or the switchable current source is controlled with the reset pin of the resetable integrator.

The time clock is used to set up the switching frequency and synchronize several reset functions in each required block. The ramp of the PWM generator is generated from the time clock Fs and the resetable integrator RESETI1. It can be in a triangle or saw waveform.

Figure 3:
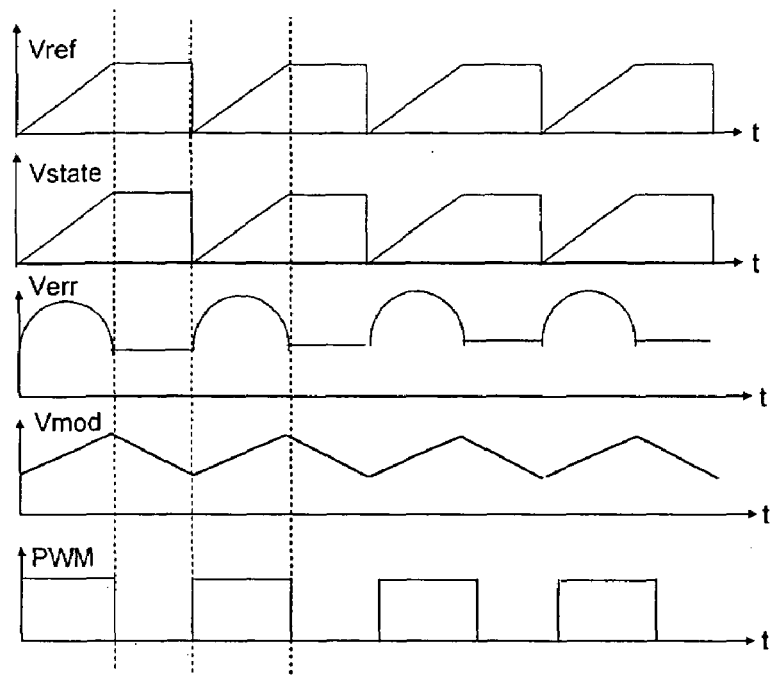
FIG. 3 is one timing diagram of embodiment of FIG. 2.

The reference signal, or reference current, is chopped with a SW and then as an input to the resetable integrator RESETI3. At the same time, the state variable of the switching converter, or the inductor current, is detected though the power switch and as an input to the resetable integrator RESETI2. It is clear that both inputs have correspondent amplitudes when the PWM pulse is at high level "1" and both inputs are at zero when the PWM pulse is at the low level of "0" also. The outputs from resetable integrators are shown in FIG. 3. They are ramp-up and kept constant as the PWM pulse is at low level "0". As the time clock comes along, both outputs are reset to zero very quickly, and after then they are ramped up again in a certain slope based on the input signal amplitudes of resetable integrators.

The outputs from the two resetable integrators are summed to generate the difference that is much closer to the difference between the reference current and average inductor current. Of course, there are several additional errors. For example, as the PWM pulse is at a low level "0", the two outputs of two resetable integrators keep the last constant values and the output from the sum during PWM pulse at a low level "0" interval is the last output before the PWM pulse is at a low level "0" and is not the real difference between the reference current and the average inductor current during the PWM pulse at the low level "0" interval. As shown in FIG. 3, as the time clock comes along, both outputs of resetable integrators are reset to zero, which means, at that instant, the output of the sum is zero and is neither the last output before the PWM pulse is at low level "0" nor the real difference between the reference current and average inductor current during the PWM pulse at a low level "0" interval. Due to the following error amplifier and whole loop regulations, the additional errors can be corrected and ignored.

The following blocks from the sum are the same as the blocks in the average current mode control scheme or the error amplifier PID compensation regulator, signal range limiter LIM and comparator.

Figure 4:
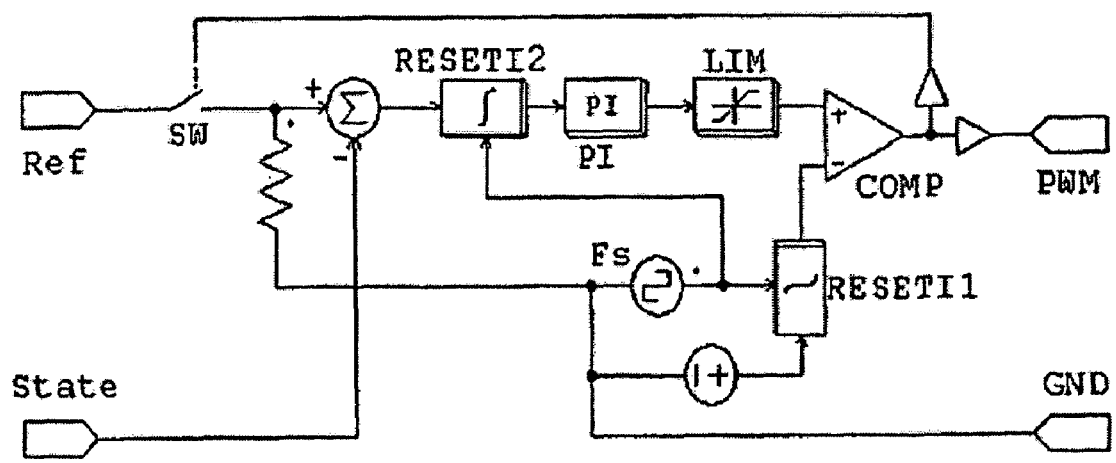
FIG. 4 is another of detailed embodiment of the "Quasi Average Current Mode Control" scheme block diagram of the present invention.

FIG. 4 shows another detailed embodiment of invention scheme block diagram. In the detailed block diagram, there are several blocks, SW, PI, LIM, COMP, RESETI and a time clock Fs.

There are two resetable integrators in the whole block diagram. The resetable integrator is easy to build up. It can be based on what is mentioned in the FIG. 2 detailed embodiment of an invention scheme block diagram.

It is the same for what is in the FIG. 2 detailed embodiment of the invention scheme block diagram. The time clock Fs is used to set up the switching frequency and synchronize several reset functions in each required block. The ramp of the PWM generator is generated from the time clock Fs and the reset-able integrator RESETI1. It can be a triangle or saw waveform.

Figure 5:
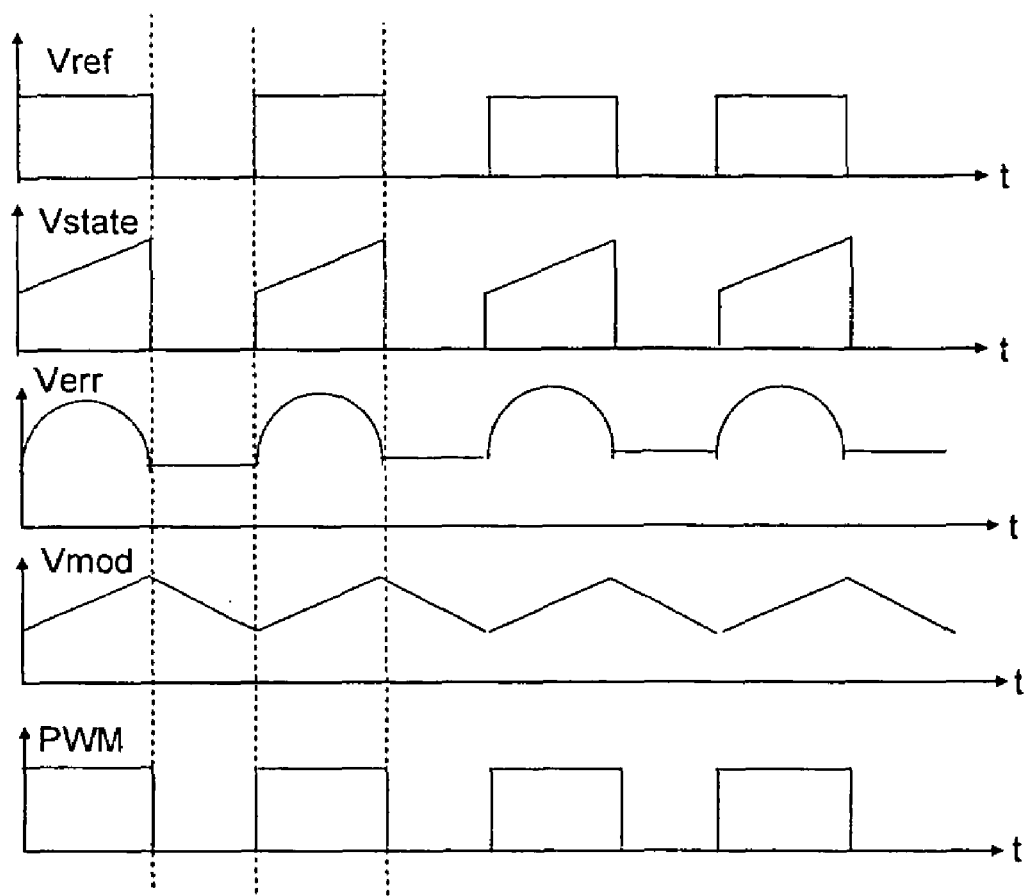
FIG. 5 is another timing diagram embodiment of FIG. 4.

In FIG. 4, the reference signal otherwise known as the reference current, is chopped with a SW, and at the same time, the state variable of the switching converter, or inductor current, is detected though the power switch. It is clear that both inputs have correspondent amplitudes when the PWM pulse is at a high level "1" and both inputs are at zero when the PWM pulse is at low level "0". The inputs of the sum are shown in FIG. 5. They are close to a square waveform. The output of the sum is as an input of the resetable integrator RESETI2. The output of the resetable integrator RESETI2 is shown in FIG. 5 and it is identical to the output of the sum in FIG. 3. It is much closer to the difference between the reference current and average inductor current. It has the same error mentioned in FIG. 2's detailed embodiment of the invention scheme block diagram.

The following blocks from the sum is the same as the blocks in the average current mode control scheme, or in other words, the error amplifier PID compensation regulator, signal range limiter LIM and comparator.

The key issue of the control scheme is to detect both the reference current and inductor current in the same operation and in the same time interval that is the power switch turn-on interval and reset both signals to zero as out of the interval, or the power switch turn-off interval.

To apply to the control scheme, the cheapest way is to detect the power switch current. The power switch can be the main power switch or any other power switch, e.g. a freewheel diode for buck, boost, and buck-boost basic circuits. As long as the inductor current passes through the power device and the power device's current can be detected, the power device's current can be represented as a part of the inductor current.

The benefit of using "Quasi Average Current Mode Control" technology is that it is the simplest and lowest cost detecting way to implement the equivalent average current mode control performance. Due to the integration function in the control scheme, the control scheme is insensitive with noise. It is very easy and helpful for a switching converter PCB layout.

What is claimed is:

1. A quasi average current mode control circuit for controlling a DC-DC switching power converter comprising:
    a pre-set high frequency reference circuit operable to chop a reference signal and generate a signal having a particular format;
    a state detection circuit for detecting a turn on inductor current of the DC-DC switching power converter only during the entire turn on time and for converting the detected turn on inductor current to the particular format;
    an error generator for generating an error signal including a difference signal between the formatted reference signal and the formatted detected inductor current;
    an error amplifier for amplifying and compensating the error signal and generating a modulation signal; and
    a pulse width modulator for converting the modulation signal to a series of pulse width modulator pulses.

2. The quasi average current mode control circuit of claim 1, wherein the pre-set high frequency reference circuit is operable to integrate the chopped reference signal in a first resetable integrator to generate the formatted reference signal and wherein the state detection circuit is operable to integrate the detected turn on inductor current in a second resetable integrator to generate the formatted detected inductor current.

3. The quasi average current mode control circuit of claim 2, wherein the first and second resetable integrators comprise a voltage-current converter, a capacitor and a switch.

4. The quasi average current mode control circuit of claim 2, wherein the first and second resetable integrators comprise a voltage-current converter, a capacitor and a switchable current source.

5. The quasi average current mode control circuit of claim 1, wherein the state detection circuit comprises a sense resistor.

6. The quasi average current mode control circuit of claim 1, wherein the error generator and the error amplifier comprise a combined circuit.

7. The quasi average current mode control circuit of claim 1, wherein the pulse width modulator is operable to synchronize the reference circuit, the state detection circuit and the error generator.

8. A quasi average current mode control circuit for controlling a DC-DC switching power converter comprising:
    a pre-set high frequency reference circuit operable to chop a reference signal and generate a signal having a first format;
    a state detection circuit for detecting a turn on inductor current of the DC-DC switching power converter only during the entire turn on time and for converting the detected turn on inductor current to a second format;
    an error generator for generating an error signal including a difference signal between the formatted reference signal and the formatted detected inductor current;
    an error amplifier for amplifying and compensating the error signal and generating a modulation signal; and
    a pulse width modulator for converting the modulation signal to a series of pulse width modulator pulses.

* * * * *